US006615871B2

(12) United States Patent
Ohmi et al.

(10) Patent No.: US 6,615,871 B2
(45) Date of Patent: Sep. 9, 2003

(54) FLUID CONTROL APPARATUS

(75) Inventors: Tadahiro Ohmi, Sendai (JP); Hiroshi Morokoshi, Osaka (JP); Michio Yamaji, Osaka (JP); Shigeaki Tanaka, Osaka (JP); Keiji Hirao, Osaka (JP); Yuji Kawano, Osaka (JP); Takashi Hirose, Osaka (JP); Kosuke Yokoyama, Osaka (JP); Michio Kuramochi, Osaka (JP); Masayuki Hatano, Osaka (JP); Nobukazu Ikeda, Osaka (JP)

(73) Assignees: Tadahiro Ohmi, Sendai (JP); Fujikin Incorporated, Osaka (JP)

( * ) Notice: Subject to any disclaimer, the term of this patent is extended or adjusted under 35 U.S.C. 154(b) by 0 days.

(21) Appl. No.: 10/277,147

(22) Filed: Oct. 22, 2002

(65) Prior Publication Data

US 2003/0041910 A1 Mar. 6, 2003

Related U.S. Application Data

(63) Continuation of application No. 09/023,416, filed on Feb. 13, 1998.

(30) Foreign Application Priority Data

Feb. 14, 1997 (JP) .......................................... 9-029996

(51) Int. Cl.[7] .............................................. F16K 11/10
(52) U.S. Cl. ...................................... 137/884; 137/597
(58) Field of Search ................................ 137/269, 270, 137/271, 597, 884

(56) References Cited

U.S. PATENT DOCUMENTS

| | | | | |
|---|---|---|---|---|
| 3,525,363 A | | 8/1970 | Gore | 137/625.47 |
| 3,536,100 A | | 10/1970 | Marlow et al. | 137/625.47 |
| 3,556,153 A | | 1/1971 | Barbuto et al. | 137/625.47 |
| 4,516,596 A | | 5/1985 | Sugisawa et al. | 137/240 |
| 5,065,794 A | | 11/1991 | Cheung | 137/599 X |
| 5,205,322 A | | 4/1993 | Merick et al. | 137/597 |
| 5,241,987 A | | 9/1993 | Ohmi et al. | 137/597 |
| 5,246,026 A | | 9/1993 | Proudman | 137/3 |
| 5,313,982 A | | 5/1994 | Ohmi et al. | 137/597 |
| 5,368,062 A | * | 11/1994 | Okumura et al. | 137/240 |
| 5,488,925 A | * | 2/1996 | Kumada | 137/884 |
| 5,590,686 A | | 1/1997 | Prendergast | 137/597 |
| 5,657,786 A | | 8/1997 | DuRoss et al. | 137/240 X |
| 5,749,389 A | | 5/1998 | Ritrosi et al. | 137/240 X |
| 5,769,110 A | * | 6/1998 | Ohmi et al. | 137/269 |
| 5,819,782 A | * | 10/1998 | Itafuji | 137/240 |
| 5,992,463 A | * | 11/1999 | Redemann et al. | 137/884 |

FOREIGN PATENT DOCUMENTS

| | | |
|---|---|---|
| EP | 0 488 117 A1 | 6/1992 |
| EP | 0 619 450 A1 | 10/1994 |
| FR | 2 664 671 | 1/1982 |
| WO | WO 96/29529 | 9/1996 |
| WO | WO 96/34705 | 11/1996 |

* cited by examiner

*Primary Examiner*—John Fox
(74) *Attorney, Agent, or Firm*—Armstrong, Westerman & Hattori, LLP

(57) ABSTRACT

An on-off device disposed at each of the inlet and the outlet of a fluid controller is one of five kinds of on-off devices, i.e., on-off device having a two-port valve, on-off device having a two-port valve and a three-port valve, on-off device having a two-port valve and two three-port valves, on-off device having two three-port valves, and on-off device having three three-port valves, The main bodies of two-port valves of all types of on-off devices are identical in configuration and each have an inlet and an outlet in a bottom face thereof. Main bodies of three-port valves of all types of on-off devices are identical in configuration and each formed in a bottom face thereof with an inlet, an outlet always in communication with the inlet, and an inlet-outlet subopening.

12 Claims, 8 Drawing Sheets

FLUID CONTROL APPARATUS

This is a continuation of application Ser. No. 09/023,416 filed Feb. 13, 1998.

BACKGROUND OF THE INVENTION

The present invention relates to fluid control apparatus for use in semiconductor manufacturing equipment.

With reference to FIG. 8, the fluid control apparatus included in semiconductor manufacturing equipment comprises main components, i.e., a plurality of (e.g., three shown) massflow controllers 3 and one or a plurality of on-off valves 111, 112 disposed at the inlet side and outlet side of each massflow controller 3. The apparatus further additionally includes filters 113, check valves 114, etc.

The line (first line) 115 including the massflow controller 3 at the left side has one filter 113 at the inlet side of the controller 3 and one on-off valve 111 at the outlet side thereof. The line has one inlet and one outlet, The line (second line) 116 including the second massflow controller 3 from the left has two on-off valves 112 and one check valve 114 which are in the form of a block and one filter 113 at the inlet side of the controller 3, three on-off valves 111 at the outlet side thereof, and a bypass channel 118 provided between the inlet and outlet sides of the controller 3 and not extending through the controller 3. The line (third line) 117 including the massflow controller 3 at the right has two on-off valves 112 and one check valve 114 which are in the form of a block and one filter 113 at the inlet side of the controller 3, and two on-off valves 111 at the outlet side thereof. The lines 115, 116, 117 are connected to one another at the inlet side of the three controllers 3, while the outlet of the first line 115 is connected to one outlet of the second line 116.

As illustrated, tubes 119 are used for connecting the massflow controller 3 to the on-off valves 111, 112 and connecting the on-off valves 111 to each other. Tubes 119 are connected to each other by L-shaped pipe joint 120 or T-shaped pipe joint 121.

The fluid control apparatus shown in FIG. 8 is only one example. While fluid control apparatus comprise various lines, the lines constituting such apparatus are limited generally to the five kinds shown in FIG. 9 in view of the number and flow of fluids.

With reference to FIG. 9, a line 131 at the left end is adapted to pass one kind of fluid through a fluid controller 3 such as massflow controller. A line 132, the second from the left, passes two kinds of fluids through a fluid controller 3. The third from the left is a line 133 for passing two kinds of fluids through a fluid controller 3, with an evacuating channel 133*a* connected to the outlet side of the controller 3. The fourth from the left is a line 134 adapted to pass two kinds of fluids through a fluid controller 3 and including a bypass channel 134*a* provided between the inlet and the outlet of the controller 3 and not extending through the controller shown at the right end is a line 135 adapted to pass two kinds of fluids through a fluid controller 3 and including an evacuating channel 135*a* connected to the outlet side of the controller 3 and a bypass channel 135*b* provided between the inlet and the outlet of the controller 3 and not extending through the controller 3.

It is required that fluid control apparatus for use in semiconductor manufacturing equipment be reduced in the space to be thereby occupied and in the volume of channels. For this reason, it is proposed to use joint members for connecting massflow controllers to on-off valves and for connecting on-off valves to one another without using tubes (integration).

The integration can be achieved by providing as blocks on-off valves constituting the five kinds of lines shown in FIG. 9 and connecting such valves in the form of blocks to one another without using any tube. An increase in the number of different kinds of parts, especially an increase in the number of kinds of on-off valves which are main components, is a great problem encountered in providing integrated and compacted lines.

SUMMARY OF THE INVENTION

An object of the present invention is to provide a fluid control apparatus which is integrated and compacted without using an increased number of different kinds of on-off valves which are the main components of the apparatus.

The present invention provides a fluid control apparatus which is characterized in that the apparatus comprises a plurality of fluid controllers, and a plurality of on-off devices arranged respectively at an inlet side and an outlet side of each of the fluid controllers, each of the on-off devices comprising one valve or a plurality of valves, with the adjacent valves connected to each other without using tubing, each of the on-off devices being one of five kinds including a 2-type on-off device having a two-port valve, a 2-3-type on-off device having a two-port valve and a three-port valve, a 2-3-3-type on-off device having a two-port valve and two three-port valves, a 3-3-type on-off device having two three-port valves, and a 3-3-3-type on-off device having three three-port valves, main bodies of two-port valves of all types of on-off devices being identical in configuration and each having an inlet and an outlet in a bottom face thereof, main bodies of three-port valves of all types of on-off devices being identical in configuration and each formed in a bottom face thereof with an inlet, an outlet always in communication with the inlet, and an inlet-outlet subopening.

The terms upper and lower (bottom) as used herein refer respectively to the upper and lower sides of FIGS. 3 and 4. However, these terms are used for the sake of convenience, the fluid control apparatus may be mounted as shown in FIGS. 3 and 4 on a horizontal surface, or turned upside down when installed on a horizontal surface or when attached to a vertical surface.

According to the invention, all the on-off devices are divided into five kinds, while the valve main bodies constituting such devices can be of only two kinds in configuration. Each valve main body has a normally open or closed actuator attached thereto. The valves are of four kinds when the different types of actuators are considered.

The foregoing construction provides various fluid control apparatus which include five kinds of on-off devices wherein the valve main bodies are of two kinds in configuration, as will be described below with reference to FIG. 2.

In the case where two kinds of fluids are to be passed through a fluid controller 3, 2-2-type on-off devices 92, 92 are arranged respectively at the inlet side and outlet side of the controller 3. The first of the fluids (e.g., main gas) flows into the controller 3 via three-port valve 102, passes through the controller 3 and then reaches the next line (e.g. a process chamber) via three-port valve 102. The second fluid (e.g., purge gas) flows through two-port valve 101 and three-port valve 102 into the controller 3, from which the gas flows through the thee-port valve 102 and two-port valve 101 into the next line (e.g., a vent line).

In the case where two kinds of fluids are to be passed through a fluid controller 3, with an evacuating line 98*a* provided at the outlet side of the controller 3, a 2-3-type on-off device 92 is disposed at the inlet side of the controller 3, and a 2-3-3-type on-off device 93 at the outlet side of the controller 3. The first of the fluids (e.g., main gas) flows into the controller 3 via three-port valve 102, passes through the controller 3 and then reaches the next line (e.g. the process chamber) via one of the three-port valves. The second fluid (e.g. purge gas) flows into the controller through two-port valve 101 and three-port valve 102, passes through the controller 3 and thereafter reaches the next line via the two three-port valves 102, 102. The evacuating channel 98*a* is connected to the two-port valve 101 of the 2-3-3-type on-off device 93.

In the case where two kinds of fluids are to be passed through a fluid controller 3, with a bypass channel 99*a* bypassing the controller 3 and provided between the inlet and outlet thereof, a 3-3-type on-off device 94, 94 is disposed at each of the inlet and outlet of the controller 3. The first of the fluids (e.g., main gas) flows into the controller 3 via one of the three-port valves 102 of the inlet-side 3-3-type on-off device 94, passes through the controller 3, end then reaches the next line (e.g., process chamber) via one of the three-port valves 102 of the outlet-side 3-3-type on-off device 94. The second fluid (e.g. purge gas) flows into the fluid controller 3 via two three-port valves 102, 102, passes through the controller 3, then reaches the next line (e.g., vent line) by way of the two three-port valves 102, 102. The other three-port valves 102, 102 of the devices 94 at the inlet and outlet sides are interconnected by the bypass channel 99*a* having an on-off valve.

In the case where two kinds of fluids are to be passed through a fluid controller 3, with an evacuating channel 100*a* is provided at the outlet side of the controller 3 and with a bypass channel 100*b* provided between the inlet and outlet sides of the controller 3 to bypass the controller 3, a 3-3-type on-off device 94 is disposed at the inlet side of the controller 3, and a 3-3-3-type on-off device 95 at the outlet side thereof. The first of the fluids (e.g., process gas) flows into the controller 3 via one of the three-port valves 102 of the device 94, passes through the controller 3, and then reaches the next line (e.g., process chamber) by way of one of the three-port valves 102 of the 3-3-3-type on-off device 95. The second fluid (e.g., purge gas) flows into the controller 3 via the two three-port valves 102, 102, passes through the controller 3 and then reaches the next line (e.g., vent line) via two three-port valves 102, 102. The other three-port valve 102 of the 3-3-type on-off device 94 is connected to the remaining three-port valve 102 of the 3-3-3-type on-off device 95 by the bypass channel 100*b*. The evacuating channel 100*a* is further connected to this valve 102.

Thus, various fluid control apparatus are provided by the five kinds of on-off devices 91 to 95 which consist only of two kinds of valve main bodies 101, 102.

DESCRIPTION OF THE PREFERRED EMBODIMENTS

Embodiments of the invention will be described below with reference to the drawings.

In the following description, the terms "left" and "right" refer respectively to the left and right sides of the drawings.

Figure 1:
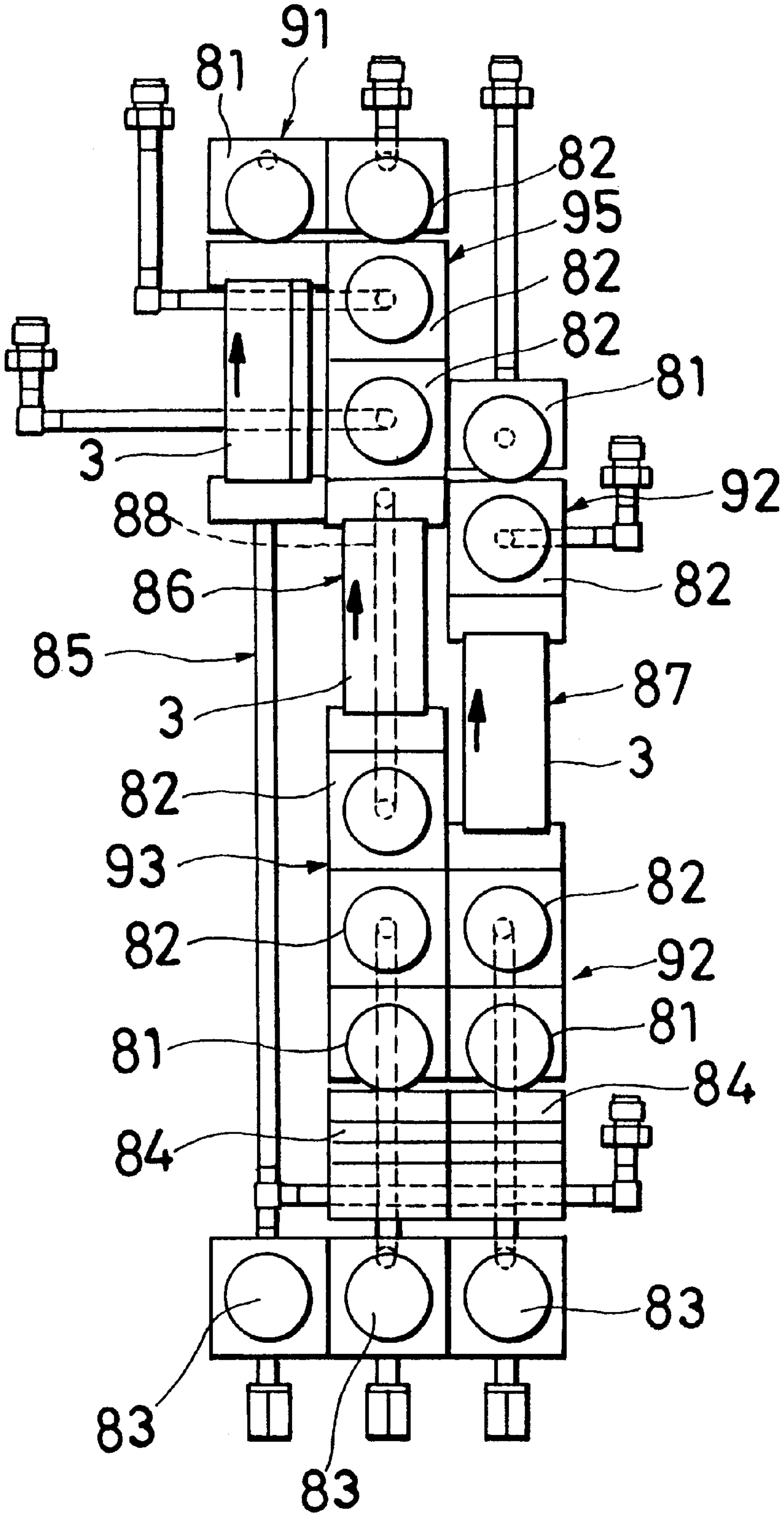
FIG. 1 is a plan view showing an embodiment of fluid control apparatus according to the invention.
Figure 8:
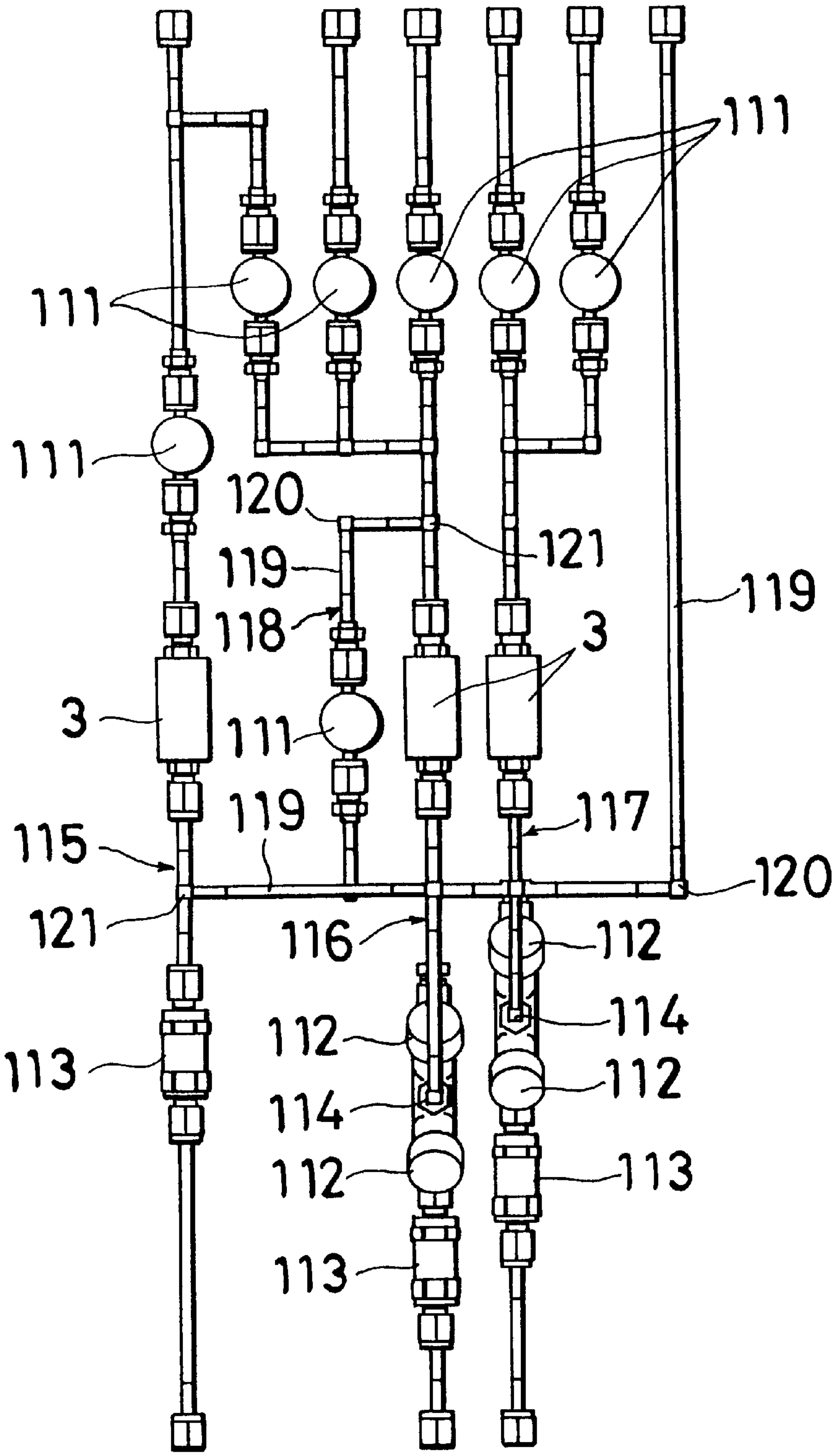
FIG.8 (PRIOR ART)
FIG. 8 is a plan view showing a conventional fluid control apparatus corresponding to the apparatus shown in FIG. 1.

FIG. 1 shows a fluid control apparatus embodying the invention and having the same function as the conventional apparatus shown in FIG. 8. The line including a massflow controller 3 at the left will be referred to as a "first line 85," the line including the second massflow controller 3 from the left as a "second line 86," and the line including a massflow controller 3 at the right as a "third line 87." The first line 85 has a filter 83 at the inlet side of the controller 3 and an on-off valve 81 at the outlet side thereof. The second line 86 has two kinds of on-off valves 81, 82, which are three in number, a check valve 84 and a filter 83 at the inlet side of the controller 3, two kinds of on-off valves 81, 82, which are three in number, at the outlet side thereof, and a bypass channel 88 provided between the inlet and outlet sides of the controller 3 and not extending through the controller 3. The third line 87 has two different on-off valves 81,82, a check valve 84 and a filter 83 at the inlet side of the controller 3, and two different on-off valves 81, 82 at the outlet side thereof. At the inlet side of the massflow controllers 3, the lines 85, 86, 87 are connected to one another, and the outlet of the first line 85 is connected to one of outlets of the second line 86.

With the fluid control apparatus shown in FIG. 1, the massflow controller 3 is connected to the on-off valve 82, and the on-off valves 81, 82 are connected to each other, not by tubing but by a joint member (at the rear side of the plane of the drawing). This achieves reductions of 61% in longitudinal dimension, 42% in horizontal dimension and 26% in area, as compared with the control apparatus of FIG. 8, hence great integration and compactness.

Moreover, the main bodies of the on-off valves 81, 82 have only two different configurations, and an increase in the number of parts is diminished to attain standardization.

The standardization is achieved by the following four arrangements A to C as will be described below in detail.

A. A fluid controller 3 and on-off devices 91, 92, 93, 94, 95 arranged at the inlet side and outlet side of the controller 3 constitute all lines.

B. All the on-off devices 91, 92, 93, 94, 95 comprise a two-port valve 101 having a main body 101*a* formed with an inlet 103 and an outlet 104 in its bottom face, a three-port valve 102 having a main body 102*a* formed in its bottom face with an inlet 107 and an outlet 106 always in communication, and further with an inlet-outlet subopening 105, and required joint members 30, 31, 32, 33, 34, 35, 36, 37, 38. The joint members 30 to 38 can be of various types as will be described below insofar as the member has a channel 108 for holding the adjacent inlet and outlet of adjacent valves 101, 102 in communication, C. The on-off devices 91 to 95 are a 2-type on-off device 91 comprising a two-port valve 101, a 2-3-type on-off device 92 comprising a two-port valve 101 and a three-port valve 102, a 2-3-3-type on-off device 93 comprising a two-port valve 101 and two three-port valves 101, 102, a 3-3-type on-off device. 94 comprising two three-port valves 102, 102, and a 3-3-3-type on-off device 95 comprising three three-port valves 102, 102, 102.

Figure 2:
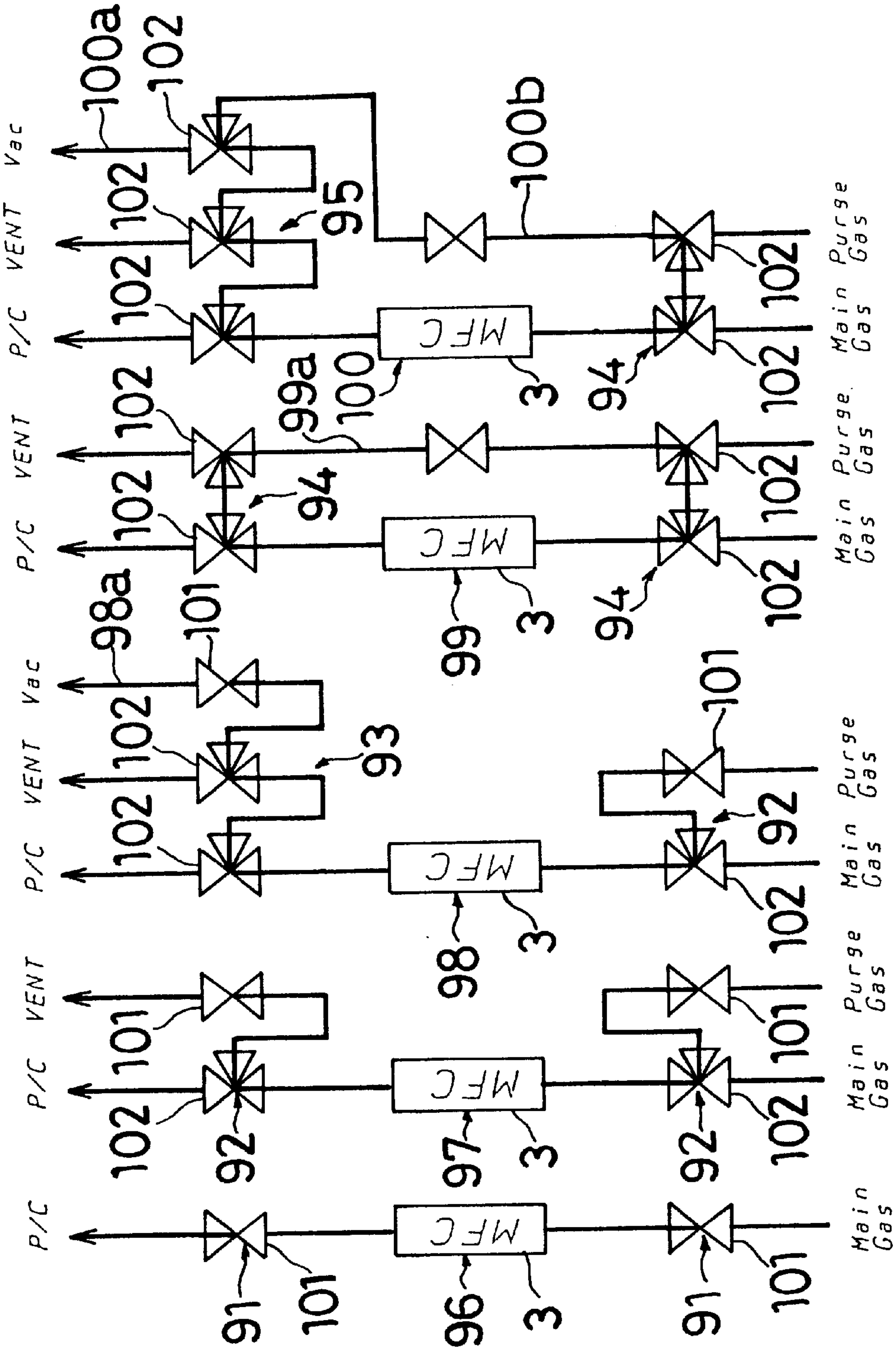
FIG. 2 is a flow chart showing five kinds of lines constituting fluid control apparatus of the invention.
Figure 9:
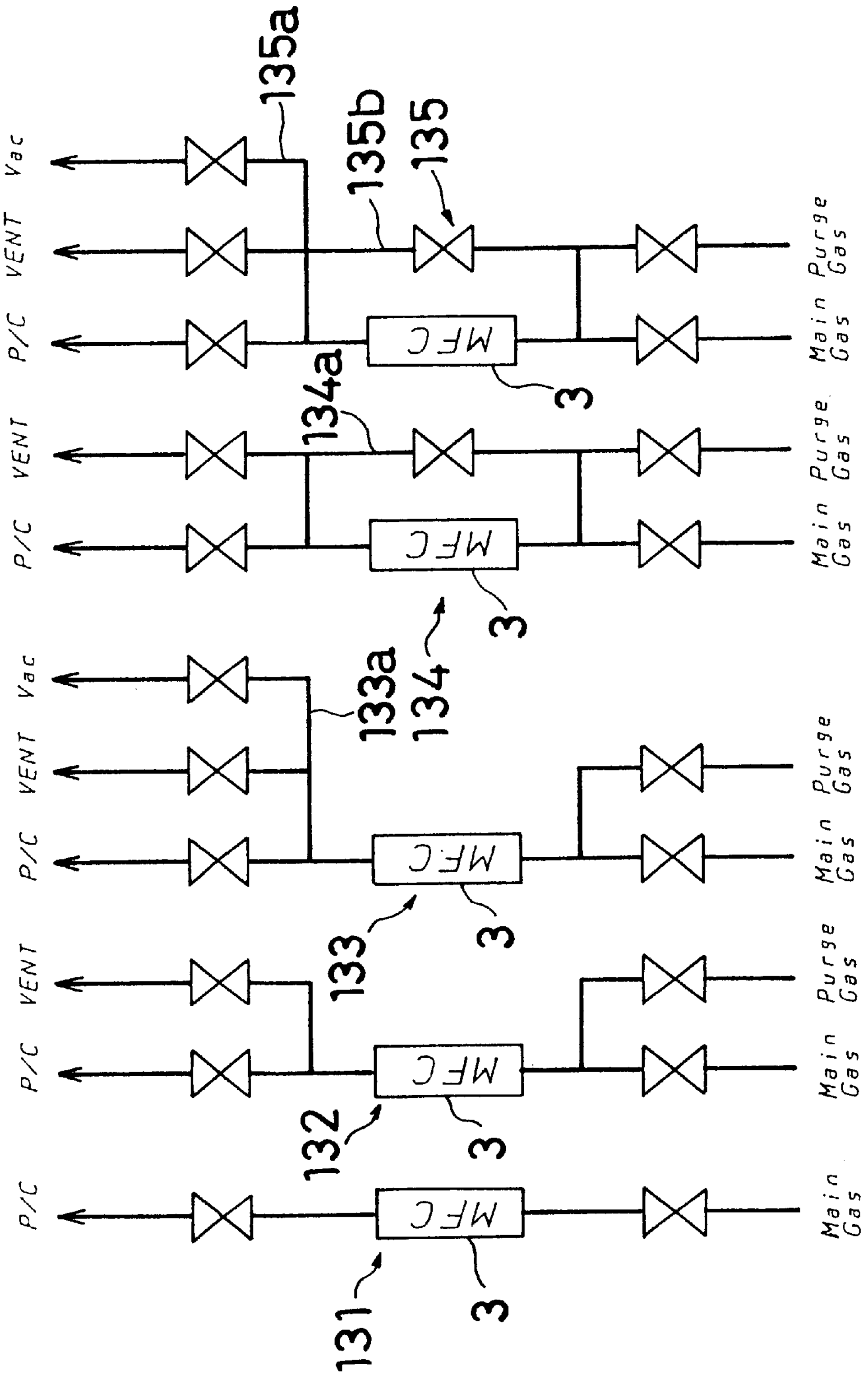
FIG. 9 (PRIOR ART)
FIG. 9 is a flow chart showing five kinds of lines constituting fluid control apparatus.

FIG. 2 shows the five kinds of lines shown in FIG. 9 and as rewritten so as to reveal the feature of the invention. With reference to FIG. 2, shown at the left end is a line 96 for passing a fluid through a fluid controller 3. This line comprises the controller 3, and a 2-type on-off device 91 disposed at each of the inlet side and outlet side of the controller 3. The second line from the left is a line 97 for passing tow kinds of fluids through a fluid controller 3. This line comprises the controller 3, and a 2-3-type on-off device 92 disposed at each of the inlet and outlet sides of the controller 3. The third from the left is a line 98 adapted to pass two kinds of fluids through a fluid controller 3 and having an evacuating channel 98*a* connected to the outlet side of the controller 3. This line 98 comprise the controller 3, a 2-3-type on-off device 92 provided at the inlet side of the controller 3 and a 2-3-type on-off device 93 provided at the outlet side of the controller 3. The fourth from the left is a line 99 adapted to pass two kinds of fluids through a fluid controller 3 and including a bypass channel 99*a* provided between the inlet side and outlet side of the controller 3 and not extending through the controller 3. The line 99 comprises the controller 3, a 3-3-type on-off device 94 disposed at the inlet side of the controller 3 and a 3-3-type on-off device 94 disposed at the outlet side of the controller 3. Shown at the right end is a line 100 adapted to pass two kinds of fluids through a fluid controller 3 and including evacuating channel 100*a* connected to the outlet side of the controller 3 and a bypass channel 100*b* provided between the inlet and outlet sides of the controller 3 and not extending through the controller 3. The line 100 comprises the controller 3, a 3-3-type on-off device 94 disposed at the inlet side of the controller 3 and a 3-3-3-type on-off device 95 disposed at the outlet side of the controller 3.

Nest with reference to FIG. 3, the five kinds of on-off devices 91 to 95 will be described. In FIG. 23, the blank triangles stand for ports 103, 105 which are opened and closed by an actuator, and the blank triangles with a single line added thereto stand for ports 104, 106, 107 which are normally open. Further with respect to the on-off devices 92 to 95 comprising a plurality of valves 101, 102, the valves 101, 102 are connected in series as arranged side by side, and the adjacent ports 104, 106, 107 are held in communication by an internal channel 108 of a joint member.

Figure 3:
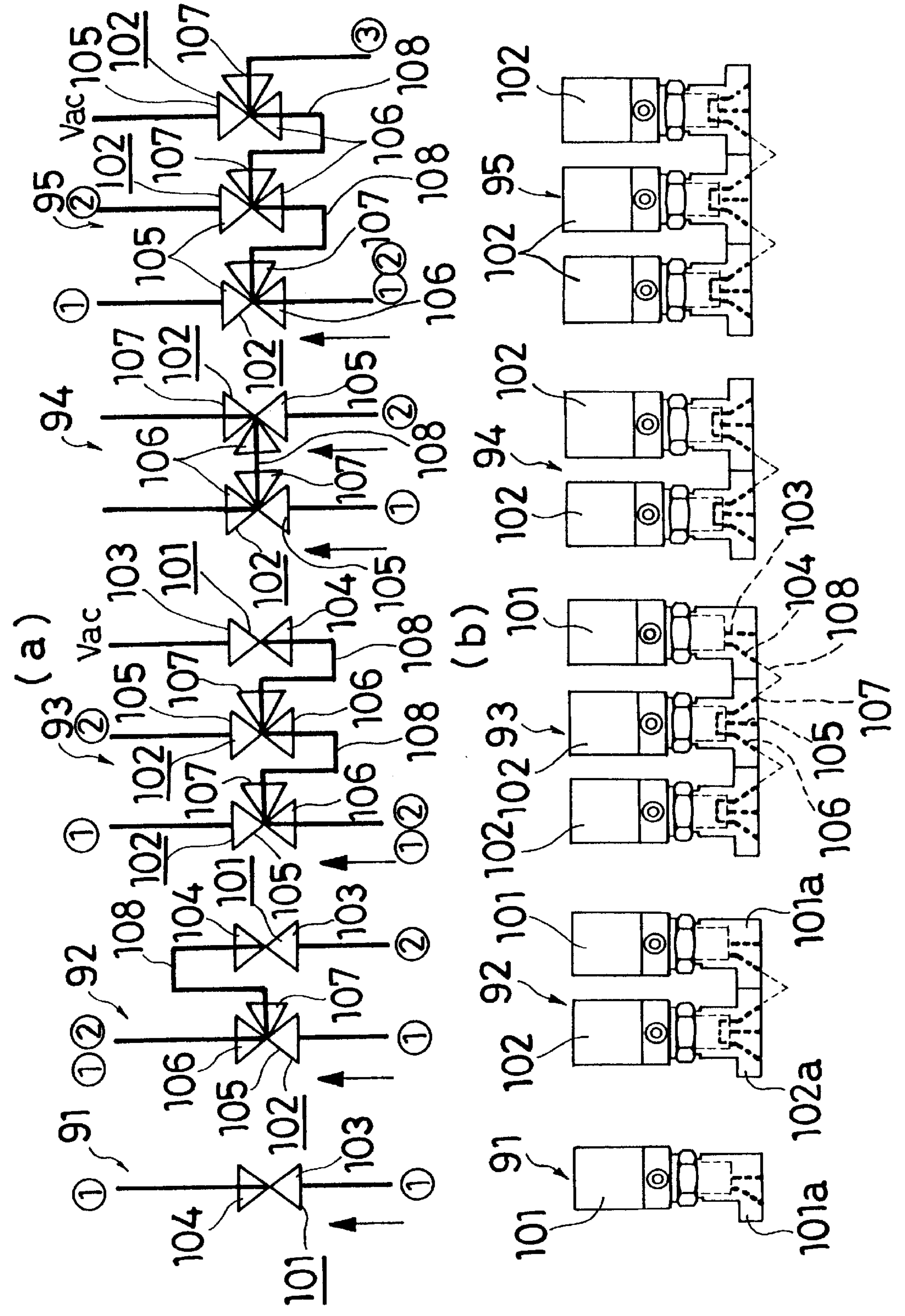
FIG. 3 is a diagram showing all kinds of on-off devices for use in five kinds of lines of FIG. 2.

With reference to FIG. 3, shown in at the left end is the 2-type on-off device 91. The second from the left is the 2-3-type on-off device 92. The third from the left is the 2-3-3-type on-off device 93, the fourth from the left is the 3-3-type on-off device 94, and shown at the right end is the 3-3-3-type on-off device 95.

The operation of each of the on-off devices 91 to 95 will now be described with reference to FIG. 3. Of the two ports 103, 104 of the two-port valve 101 shown in FIG. 3, the port to opened and closed directly by the actuator will be referred to as a "first port 103," and the other port as a "second port 104." Of the three ports 105, 106, 107 of the three-port valve 102, the portion to be opened and closed directly by the actuator will be referred to as a "first port 105," and of the two other ports 106, 107, the one at the left in the drawing will be referred to as a "second port," and the one at the right as a "third port 107."

With the 2-type on-off device 91, a fluid (1) flowing in through the first port 103 of the two-port valve 101 flows out from the second port 104 when the actuator is open.

With the 2-3-type on-off device 92, when the actuator for the three-port valve 102 is open with the actuator for the two-port valve 101 closed, a fluid (1) flowing in through the first port 105 of the three-port valve 102 flows out from the second port 106 of the three-port valve 102. On the other hand when the actuator for the three-port valve 102 is closed with the actuator for the two-port valve 101 held open, a fluid (2) flowing in through the first port 103 of the two-port valve 101 reaches the third port 107 of the three-port valve 102 via the second port 104 of the valve 101 and the joint member channel 108 and flows out from the second port 106 which is always in communication with the third port 107.

With the 2-3-3-type on-off device 93, when the actuator for the three-port valve 102 at the left is open with the actuators for the other three-port valve 102 and the two-port valve 101 closed, a fluid (1) flowing in through the second port 106 of the three-port valve 102 at left flows out from the first port 105 of the three-port valve 102. On the other hand, when the actuator for the left three-port valve 102 is closed with the actuator for the other three-port valve 102 held open and with the actuator for the two-port valve 101 is closed, a fluid (2) flowing in through the second port 106 of the left three-port valve 102 reaches the third port 107 of the left three-port valve 102 which is always in communication with this second port 106 and flows out from the first port 105 of the other three-port valve 102 via the joint member channel 108 and the second port 106 of the other three-port valve 102. Further when the actuators for the two three-port valves 102, 102 are both closed with the actuator for the two-port valve 101 held open and when suction is applied to the first port 103 of the two-port valve 101, the suction withdraws the fluid (1) and/or (2) present in the channel extending from the second port 106 of the left three-port valve 102 through the third port 107 of the same, the joint member channel 108, the second port 106 of the other three-port valve 102, the third port 107 of the same valve and the second port 104 of the two-port valve 101 to the first port 103 of the two-port valve 101.

With the 3-3-type on-off device 94, when the actuator for the left three-port valve 102 is open with the actuator for the other three-port valve 102 closed, a fluid (1) flowing in through the first port 105 of the left three-port valve 102 flows out from the second port 106 of the same valve. When the outlet side of the third port 107 of the other three-port valve 102 is held open, the fluid (1) can be allowed to flow out from the third port 107 of the other three-port valve 102 by way of the third port 107 of the left three-port valve 102 and the second port 106 of the other three-port valve 102. On the other hand, when the actuator for the left three-port valve 102 is closed with the actuator for the other three-port valve 102 is held open, a fluid (2) flowing in through the first port 105 of the other three-port valve 102 flows out from the second port 106 of the same valve via the joint member channel 108, and the third port 107 and second port 106 of the left three-port valve 102. When the outlet side of the third port 107 of the other three-port valve 102 is held open, the fluid (2) can be allowed to flow out through this third port 107.

With the 3-3-3-type on-off device 95, when the actuator for the three-port valve 102 at the left end is open with the actuators for the other two three-port valves 102 closed, a fluid (1) flowing in through the second port 106 of the left three-port valve 102 flows out from the first port 105 of the same valve. On the other hand, when the actuator for the three-port valve 102 at the left end is closed with the actuator for the middle three-port valve 102 held open and with the actuator for the three-port valve 102 at the right end closed, a fluid (2) flowing in through the second port 106 of the left three-port valve 102 reaches the third port 107 of the left three-port valve 102, further flows through the joint member channel 108 and the second port 106 of the middle three-port valve 102 and flows out from the first port 105 of this three-port valve 102. Further when the actuators for the left and middle three-port valves 102, 102 are closed with the actuator for the right three-port valve 102 held open; and when suction is then applied to the first port 105 of the right three-port valve 102, the section acts to withdraw the fluid (1) and/or (2) present in the channel extending from the second port 106 of the left three-port valve 102, through the third port 107 of the same valve, the second and third ports 106, 107 of the middle three-port valve and the second port 106 of the right three-port valve 102 to the first port 105 of the right three-port valve 102. Still another fluid (3) can be caused to flow in through the third port 107 of the right three-port valve 102 and to flow out from the first port 105 of either one of the three-port valve 102.

In the case of the fluid control apparatus shown in FIG. 1, the first line 85 comprises a filter 83, fluid controller 3 and 2-type on-off device 91; the second line 96 comprises a filter 83, check valve 84, 2-3-3-type on-off device 93, fluid controller 3 and 3-3-3-type on-off device 95; and the third line 87 comprises a filter 83, check valve 84, 2-3-type on-off device 92, fluid controller 3 and 2-3-type on-off device 92.

Figure 4:
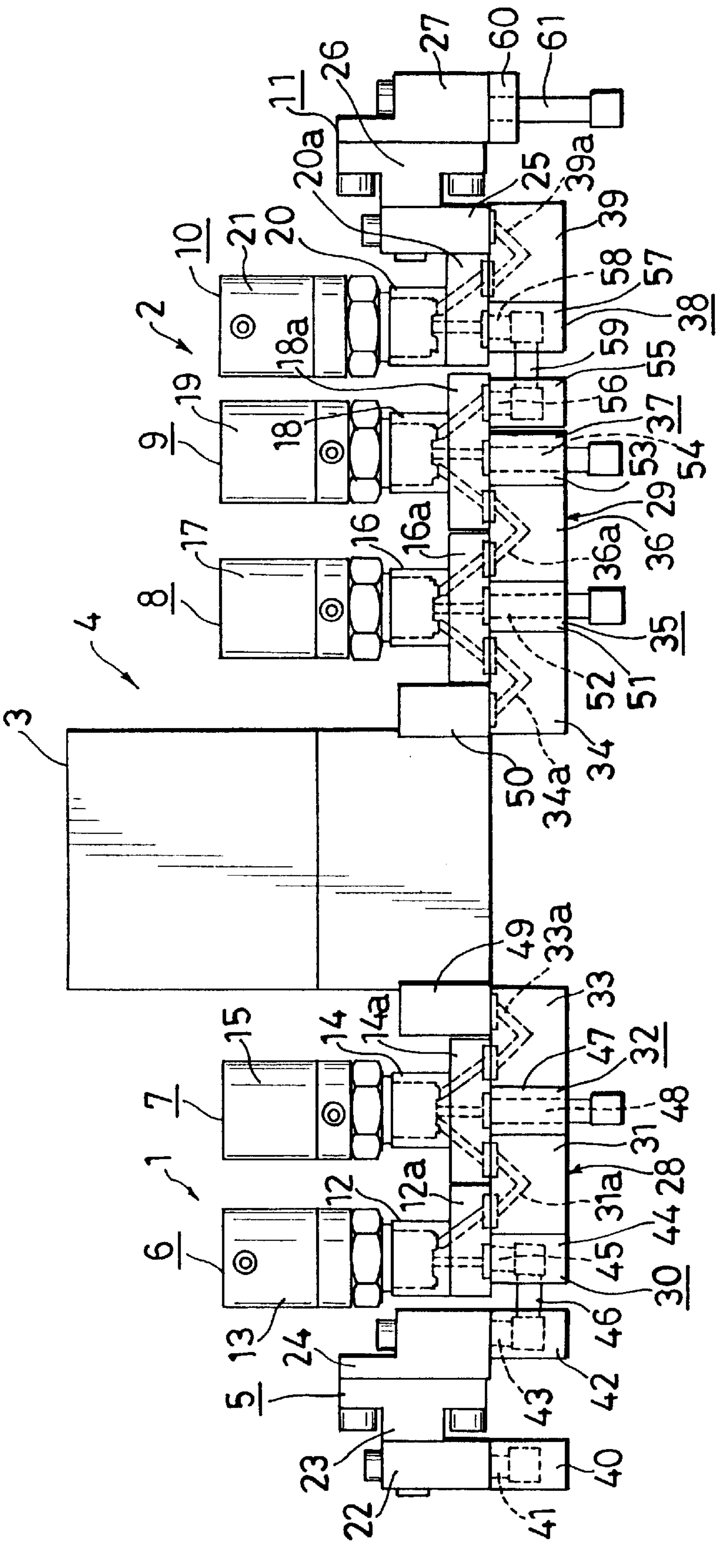
FIG. 4 is a front view showing an example of line constituting a fluid control apparatus of the invention.
Figure 5:
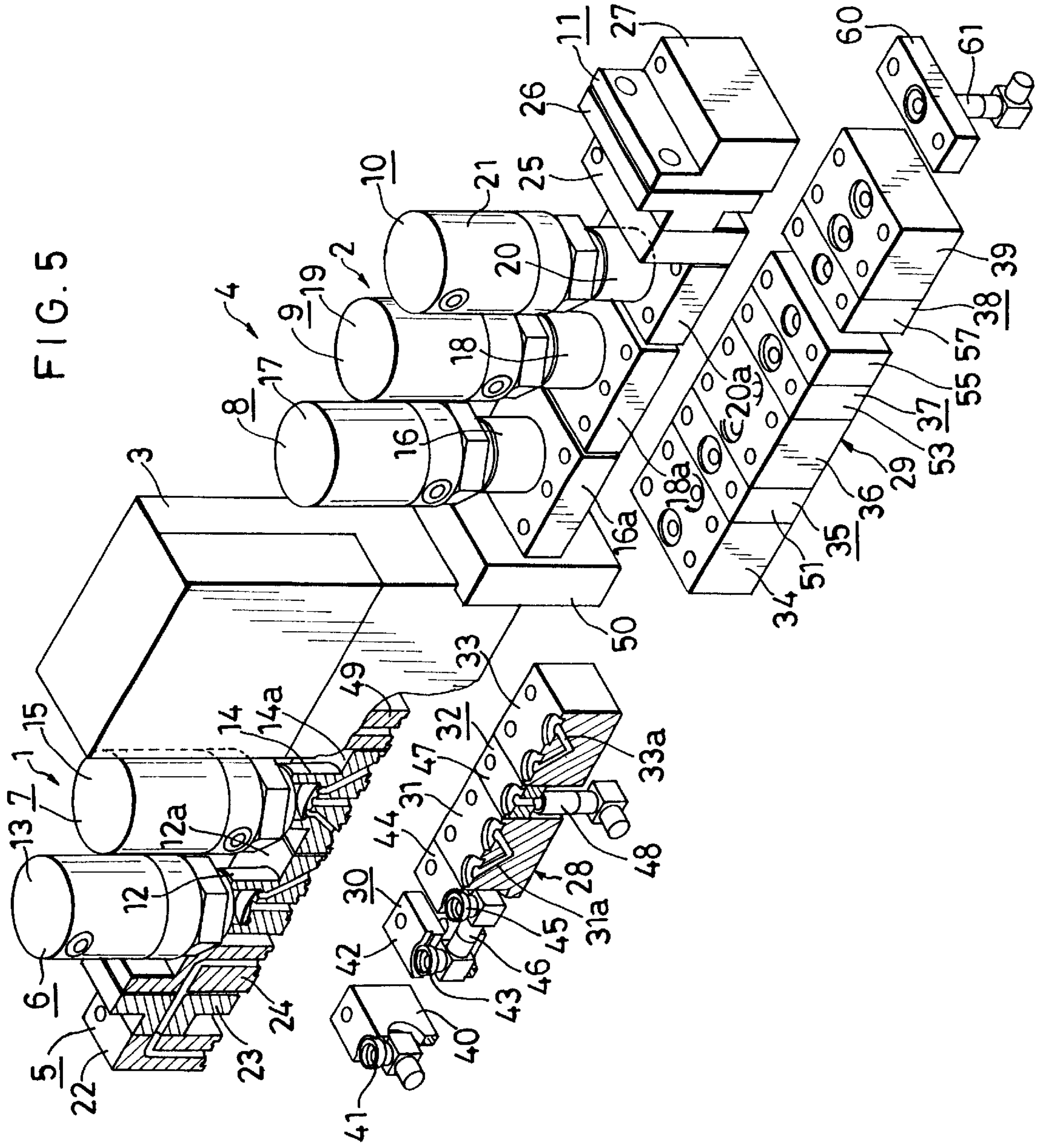
FIG. 5 is an exploded perspective view partly in section and showing the same.
Figure 6:
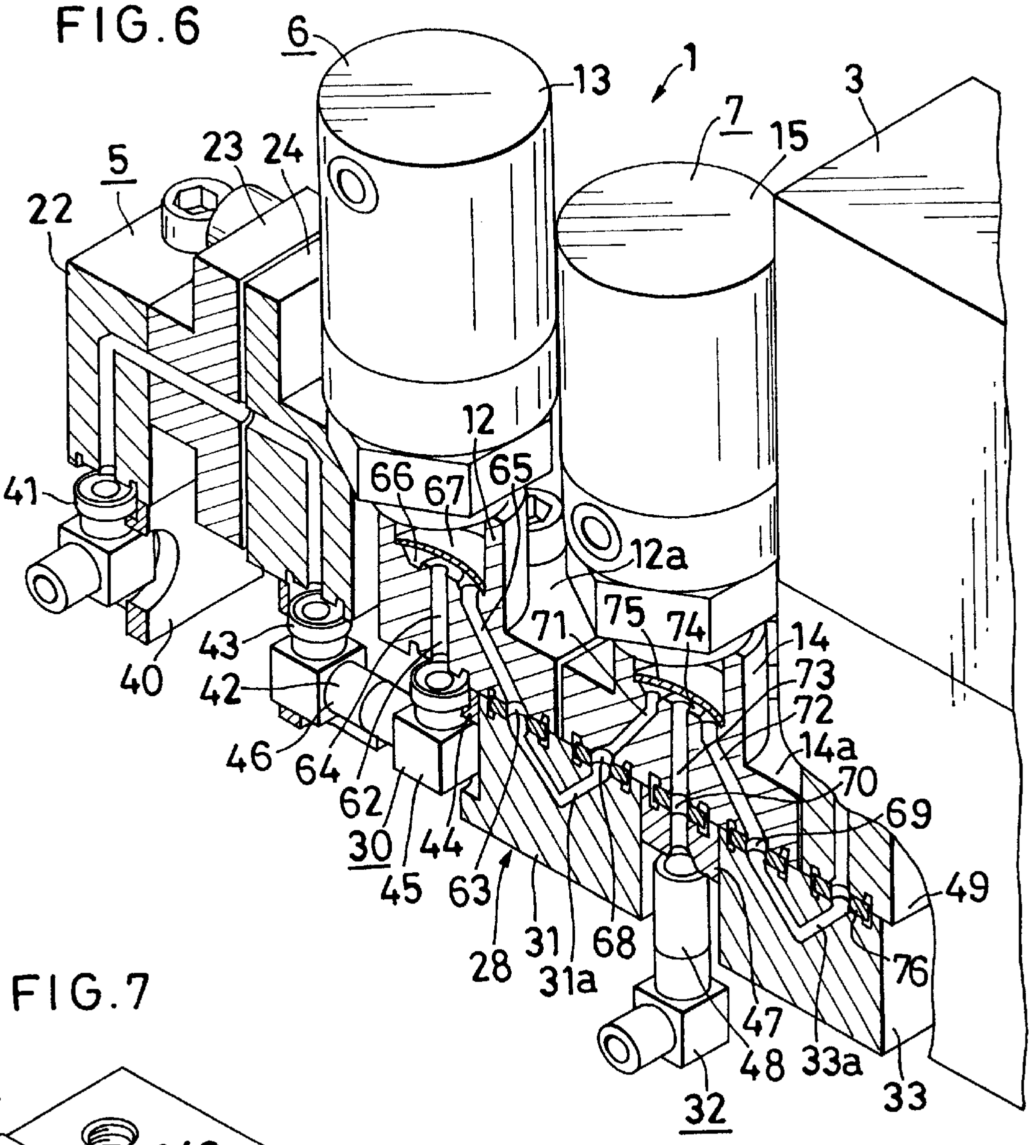
FIG. 6 is an enlarged perspective view partly in section and showing the fluid control apparatus.

Next, described with reference to FIGS. 4 to 6 is the line 98 shown in the center of FIG. 2 as applied specifically to a fluid control apparatus, especially the construction of joint members for interconnecting valves. In these drawings, an on-off device 1 at the inlet side-(left side) of the massflow controller is the 2-3-type on-off device indicated at 92 in FIGS. 2 and 3, and an on-off device 2 at the outlet side (right side) of the controller is the 2-3-3-type on-off device indicated at 93 in FIGS. 2 and 3.

The on-off device 1 at the inlet side comprises a first on-off valve 6 at left, a second on-off valve 7 at right and a first valve mount 28 having the two valves 6, 7 mounted thereon. The first on-off valve 6 is a two-port valve indicated at 101 in FIGS. 2 and 3. The second on-off valve 7 is a three-port valve indicated at 102 in FIGS. 2 and 3. The first valve mount 28 comprises a plurality of joint members 30 to 33 as will be described later. Disposed at the left of the on-off device 1 is a first check valve 5.

The on-off device 2 at the outlet side comprises a third on-off valve 8 disposed at left, a fourth on-off valve 9 disposed at an intermediate position, a fifth on-off valve 10 disposed at right and a second valve mount 29 having these valve 8, 9, 10 mounted thereon. The third and fourth on-off valves 8, 9 are three-port valves indicated at 102 in FIGS. 2 and 3. The fifth on-off valve 10 is a two-port valve indicated at 101 in these drawings. The second valve mount 29 comprises a plurality of joint members 34 to 39 as will be described later. Disposed at the right of the on-off device 2 is a second check valve 11.

The on-off valves 6, 7, 8, 9, 10 comprise respective main bodies 12, 14, 16, 18, 20 and respective actuators 13, 15, 17, 19, 21 mounted thereon from above for suitably opening and closing a channel through each valve main body. The main bodies 12 to 20 of the on-off valves 6 to 10 are provided at their lower ends with flanges 12*a*, 14*a*, 16*a*, 18*a*, 20*a*, respectively, which are rectangular when seen from above. Each of the flanges 12*a* to 20*a* is attached to the mount 28 or 29 with screws driven in from above.

Each of the check valves 5, 11 comprises a left main body 22 (25) having an inlet in its bottom face, a middle main body 23 (26) screwed to the main body 22 (25) and a right main body 24 (27) having an outlet in its bottom face and fastened with screws to the middle main body 23 (26).

The massflow controller 3 is formed on the left side of its lower end with a rectangular parallelepipedal leftward extension 49 having an inlet in its bottom face, and on the right side of its lower end with a rectangular parallelepipedal rightward extension 50 having an outlet in its bottom face.

As shown on an enlarged scale in FIG. 6, the main body 12 of the first on-off valve 6 is formed in its bottom face with an inlet 62 positioned approximately centrally thereof, and an outlet 63 positioned at right. The valve main body 12 is internally formed with an inflow channel 64 extending from the inlet 62 to a valve chamber 66, and an outflow channel 65 extending from the outlet 63 to the chamber 66. The actuator 13 serves to operate a valve element 67 in the form of a diaphragm. When operated, the actuator 13 opens or closes the inflow channel 64 with the valve element 67.

The main body 14 of the second on-off valve 7 is formed in its bottom face with an inlet 68 at left, an outlet 69 at right and an inlet-outlet subopening 70 positioned approximately in the center to serve as an inlet or outlet for other fluid. The valve main body 14 is internally formed with an inflow channel 71 extending from the inlet 68 to a valve chamber 74, a subchannel 73 extending from the subopening 70 to the chamber 74 and an outflow channel 72 extending from the outlet 69 to the chamber 74. The actuator 15 serves to operate a valve element 75 in the form of a diaphragm. When operated, the actuator 15 opens or closes the subchannel 73 with the valve element 75. On the other hand, the inflow channel 71 extending to the inlet 68 is always in communication with the outflow channel 72 extending to the outlet 69 through the valve chamber 74.

The bottom faces of the valve main bodies 22, 23, 24, 12, 14 at the left of the massflow controller 3 and the bottom face of the leftward extension 49 of the controller 3 are all flush with one another. The rightward extension 50 of the controller 3 and the valve main bodies 16, 18, 20, 25, 26, 27 have their bottom faces positioned all flush with one another.

The inlet of left main body 22 of the first check valve 5 is provided with a joint 41 held by a rectangular parallelepipedal joint holding member 40. The joint is in communication with a purge gas introduction channel.

The outlet of right main body 24 of the first check valve 5 and the inlet of main body 12 of the first on-off valve 6 are provided respectively with joints 43, 45 held by respective joint holding members 42, 44 which are rectangular parallelepidedal. The joints 43, 45 are connected to each other by short tubular projections 46. These joint holding members 42, 44, joints 43, 45 and projections 46 provide a first inflow channel member 30 having a channel for introducing a fluid into the inlet-side on-off device 1.

Opposed to both the bottom face of rightward portion of main body 12 of the first on-off valve 6 and the bottom face of leftward portion of main body 14 of the second on-off valve 7 is a rectangular parallelepipedal communication channel member 31 having a V-shaped channel 31*a* for causing the outlet of the valve 6 to communicate with the inlet of the valve 7.

The inlet-outlet subopening of main body 14 of the second on-off valve 7 is provided with a joint 48 held by a rectangular parallelepipedal joint holding member 47. The joint 48 communicates with a process gas introduction channel. The joint holding member 47 and the joint 48 provide a first subchannel member 32 having a channel communicating with the subopening of the second on-off valve 7.

Disposed beneath both the rightward portion of main body 14 of the valve 7 and the leftward extension 49 of the massflow controller 3 is a rectangular parallelepipedal first outflow channel member 33 having a V-shaped channel 33*a* for sending a fluid from the outlet of the valve 7 to the controller 3.

The first inflow channel member 30, first communication channel member 31, first subchannel member 32 and first outflow channel member 33 which are positioned at the left side of the controller 3 form the first valve mount 28 of the inlet-side on-off device 1. According, the on-off device 1 has a purge gas channel through which a purge gas admitted through the check valve 5 is discharged via the first inflow channel member 30, the main body 12 of the first on-off valve 6, the first communication channel member 31, the main body 14 of the second on-off valve 7 and the first outflow channel member 33, and a process gas channel through which a process gas admitted from the bottom face of the first subchannel member 32 is discharged via the member 32, the main body 14 of the second on-off valve 7 and the first outflow channel member 33.

Disposed beneath both the rightward extension 50 of the massflow controller 3 and the leftward portion of main body 16 of the third on-off valve 8 is a rectangular parallelepipedal second inflow channel member 34 having a V-shaped channel 34*a* for introducing the fluid discharged from the controller 3 into the outlet-side on-off device 2.

The inlet-outlet subopening of main body 16 of the third on-off valve 8 is provided with a joint 52 held by a rectangular parallelepipedal joint holding member 51. The joint 52 communicates with an evacuating channel. The member 51 and joint 52 provide a second subchannel member 35 having a channel communicating with %the subopening of the third on-off valve 8.

Provided beneath both the rightward portion of main body 16 of the third on-off valve 8 and the leftward portion of main body 18 of the fourth on-off valve 9 is a rectangular parallelepipedal second communication channel member 36 having a V-shaped channel 36*a* for causing the outlet of the valve 8 to communicate with the inlet of the valve 9.

The inlet-outlet subopening of main body 18 of the fourth on-off valve 9 is provided with a joint 54 held by a rectangular parallelepipedal joint holding member 53. The joint 52 communicates with a process gas feed channel. The member 53 and joint 54 provide a third subchannel member 37 having a channel communicating with the subopening of the fourth on-off valve 9.

The outlet of main body 18 of the fourth on-off valve 9 and the inlet of main body 20 of the fifth on-off valve 10 are provided respectively with joints 56, 58 held by respective joint holding members 55, 57 which are rectangular parallelepidedal. The joints 56, 58 are connected to each other by short tubular projections 59. These joint holding members 55, 57, joints 56, 58 and projections 59 provide a third communication channel member 38 for causing the outlet of the fourth on-off valve 9 to communicate with the inlet of the fifth on-off valve 10.

Provided beneath both the rightward portion of main body 20 of the fifth on-off valve 10 and the left main body 25 of the second check valve 11 is a rectangular parallelepipedal second outflow channel member 39 having a V-shaped channel 39*a* for causing the outlet of the valve 10 to communicate with the inlet of the second check valve 11.

The second inflow channel member 34, second subchannel member 35, second communication channel member 36, third subchannel member 37, third communication channel member 38 and second outflow channel member 39 which are positioned at the right side of the controller 3 provide the valve mount 29 of the outlet-side on-off device 2. Accordingly, the on-off device 2 has a purge gas channel through which the purge gas introduced via the controller 3 is discharged by way of the second inflow channel member 34, second communication channel member 36, third communication channel member 38 and second outflow channel member 39; a process gas channel through which the process gas admitted through the controller 3 is fed to a process chamber via the second inflow channel member 34, second communication channel member 36 and third subchannel member 37; and an evacuating channel for drawing off the gas from these channels via the second subchannel member 35.

The outlet of right main body 27 of the second check valve 11 is provided with a joint 61 held by a rectangular parallelepipedal joint holding member 60. The joint 61 communicates with a purge gas discharge channel.

The left main body 22 of the first check valve 5 is joined to the joint holding member 40 with a screw driven into the left main body 22 from above. The right main body 24 of the valve 5 is joined to the joint holding member 42 with a screw driven into the main body 24 from above. Accordingly, the first check valve 5 can be removed upward by removing these screws.

A seal 76 as shown in FIG. 6 is provided between each of the valve main bodies 22, 23, 24, 12, 14, 16, 18, 20, 25, 26, 27 and one of the members 41, 30, 31, 32, 33, 34, 35, 36, 37, 38, 39, 61 joined thereto in butting contact.

With the fluid control apparatus 4 having the foregoing construction, the process gas is admitted into the first subchannel member 32 of the inlet-side on-off device 1, with the first on-off valve 6 closed, the second on-off valve 7 held open, the third on-off valve 8 closed, the fourth on-off valve 9 held open and the fifth on-off valve 10 closed, whereupon the process gas flows through the main body 14 of the second on-off valve 7 and the first outflow channel member 33 into the massflow controller 3, wherein the gas has its flow rate regulated. The gas is then admitted into the on-off device 2 at the outlet side, thereafter flows through the second inflow channel member 34, the main body 16 of the third on-off valve 8, the second communication channel member 36, the main body is of the fourth on-off valve 9 and the third subchannel member 37 and is sent into the process chamber. When the purge gas is thereafter admitted into the first check valve 5, with the first on-off valve 6 held open, the second on-off valve 7 closed, the third on-off valve 8 closed, the fourth on-off valve 9 closed and the fifth on-off valve 10 held open, the purge gas flows through the first inflow channel member 30, the main body 12 of the first on-off valve 6, the first communication channel member 31, the main body 14 of the second on-off valve 7 and the first outflow channel member 33, reaches the massflow controller 3, further flows through the second inflow channel member 34, the main body 16 of the third on-off valve 8, the second communication channel member 36, the main body 18 of the fourth on-off valve 9, the third communication channel member 38, the main body 20 of the fifth on-off valve 10, second outflow channel member 39 and the second check valve 11, and is discharged. At this time, the purge gas drives out with its own pressure the process gas remaining in the main body 14 of the second on-off valve 7, first outflow channel member 33, second inflow channel member 34 and second communication channel member 36, with the result that purge gas only flows through the apparatus in a short period of time. With the present apparatus, the purge gas channel and the process gas channel may be reversed. When the process gas is passed in this case, the purge gas will be quickly replaced by the process gas.

With the on-off devices 1, 2 at the inlet and outlet sides, the first inflow channel member 30 and the third communication channel member 38 are common members, the first communication channel member 31, first outflow channel member 33, second inflow channel member 34, second communication channel member 36 and second outflow channel member 39 are common members, and subchannel members 32, 35, 37 are also common members. In other words, the on-off device 2 at the outlet side is available only by adding one three-port on-off valve to the inlet-side on-off device 1 and adding to the valve mount 28 thereof the same members as the first communication channel member 31 and the first subchannel member 32. When the on-off valve to be added is a two-port valve, the fourth on-off valve 9 of the outlet-side on-off device 2 is replaced by a two-port valve, with the third subchannel member 37 removed from the mount 29. If this modification results in an increased valve-to-valve spacing, only the length of the short tubular projection forming the third communication channel member may be altered for adjustment.

Since the channel members 30 to 39 have no channels directly communicating with one another, these members can be joined together without any seal portion. This assures satisfactory seal properties although the first and second valve mounts 28, 29 comprise a plurality of members.

The first inflow channel member 30 and the third communication channel member 38 may each be a rectangular parallelepipedal member having a V-shaped channel. Conversely, the first communication channel member 31 or the like may comprise two joint holding members, two joints and a short tubular projection. With the fluid control apparatus 4 described, the first channel member 33, second inflow channel member 34 and second communication channel member 36 for passing the process gas are provided by rectangular parallelepidedel members having V-shaped channels 33*a*, 34*a*, 36*a*, respectively. This makes it possible to heat these members 33, 34, 36 as held between heaters, resulting in the advantage that the process gas can be heated readily. The joint member which comprises two joint holding members, two joints and a short tubular projection has the advantage that the member can be given a reduced weight as compared with blocklike joint members.

Although not shown in detail, the 2-type on-off device 91 corresponds to the inlet-side on-off device 1 with the second on-off valve 7 removed therefrom. The 3-3-type on-off device 94 corresponds to the outlet-side on-off device 2 with the fifth on-off valve 11 removed therefrom. The 3-3-3-type on-off device 95 corresponds to the outlet-side on-off device 2 wherein the fifth on-off valve 11 is replaced by-a three-port valve. One of the 2-type on-off device 91, 3-3-type on-off device 92, 2-3-3-type on-off device 93, 3-3-type on-off device 94 and 3-3-3-type on-off device 95 is disposed at the left side and right side of a massflow controller, and such arrangements are further arranged in parallel to provide various fluid control apparatus for use in semiconductor manufacturing equipment.

The joint members are standardized to the greatest possible extent in constructing the fluid control apparatus. The joint members consist only of the members having exactly the same dimensions as the first inflow channel member 30, first communication channel member 31 and first subchannel member 32 which are used in the inlet-side on-off device 1 shown in FIG. 6, and members which are obtained by slightly altering the dimensions of these members.

Figure 7:
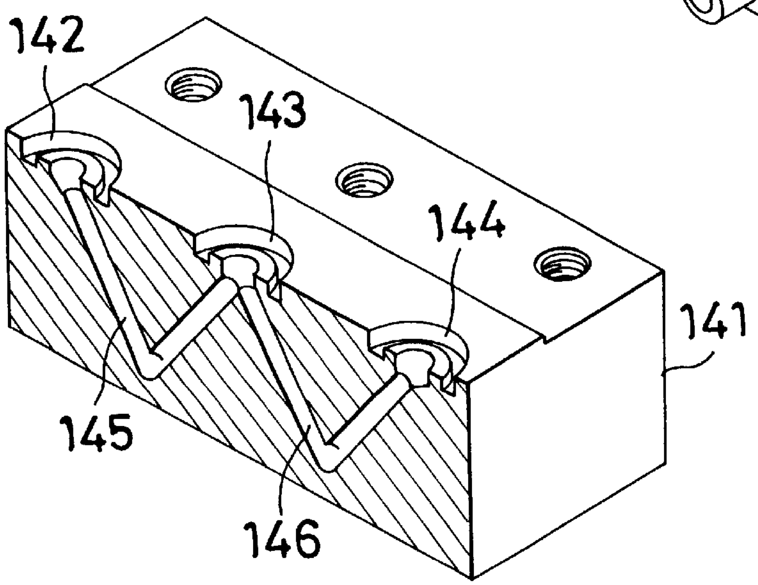
FIG. 7 is a perspective view showing a modification of joint member for use in fluid control apparatus of the invention.

In addition to the joint members shown in FIGS. 4 to 6, the one shown in FIG. 7 is usable to assure facilitated connection between adjacent lines.

FIG. 7 shows a rectangular parallelepipedal joint member 141 which has three openings 142, 143, 144 formed in its upper face, a first V-shaped channel 145 for holding the opening 142 at the left end in communication with the middle opening 143, and a second V-shaped channel 146 for holding the middle opening 143 in communication with the opening 144 at the right end. With use of this joint member 141, adjacent two lines can be caused to communicate with each other at their inlets or outlets for further connection to another line.

What is claimed is:

1. A fluid control apparatus comprising a plurality of lines, each line having a fluid controller, an inlet on-off device and an outlet on-off device arranged respectively at an inlet side and an outlet side of each of the fluid controllers, each of the on-off devices comprising one valve or a plurality of valves, with the adjacent valves interconnecting each other without using tubing, each of the on-off devices being of the type selected from the group including a 2-type on-off device having a two-port valve, a 2-3-type on-off device having a two-port valve and a three-port valve, a 2-3-3-type on-off device having a two-port valve and two three-port valves, a 3-3-type on-off device having two three-port valves, and a 3-3-3-type on-off device having three three-port valves, main bodies of two-port valves of all types of on-off devices being identical in configuration and each having an inlet port and an outlet port in a bottom face thereof, and main bodies of three-port valves of all types of on-off devices being identical in configuration and each being formed in a bottom face thereof with an inlet port, an outlet port always in communication with the inlet port, and an inlet-outlet subopening having a port separate from said inlet port and said outlet port;

each port of said two-port valves and said three-port valves being arranged in a row disposed in a common plane along said each line; and valve mounts mounting said valve main bodies including a plurality of joint members having upper surfaces disposed in substantial coplanar relation, said joint members containing internal passages communicating with ports of said valves and operatively interconnecting said valves and said fluid controllers in selected fluid flow relation, and said on-off devices including at least two types among five types of on-off devices which are said 2-type, said 2-3-type, said 2-3-3type, said 3-3-type and said 3-3-3-type.

2. A fluid control apparatus according to claim 1 wherein at least one on-off device is said 2-type and at least one on-off device is selected from the group including said 2-3-type, said 2-3-3-type, said 3-3-type and said 3-3-3-type.

3. A fluid control apparatus according to claim 2 wherein a fluid is passed through at least one of the fluid controllers, and the 2-type on-off device is disposed at each of the inlet side and the outlet side of said at least one fluid controller.

4. A fluid control apparatus according to claim 1 wherein at least one on-off device is said 2-3-type and at least one on-off device is selected from the group including said 2-type, said 2-3-3-type, said 3-3-type and said 3-3-3-type.

5. A fluid control apparatus according to claim 4 wherein two kinds of fluids are passed through at least one of the fluid controllers, and the 2-3-type on-off device is disposed at each of the inlet side and the outlet side of said at least one fluid controller.

6. A fluid control apparatus according to claim 1 wherein at least one on-off device is said 2-3-3-type and at least one on-off device is selected from the group including said 2-type, said 2-3-type, said 3-3-type and said 3-3-3-type.

7. A fluid control apparatus according to claim 1 wherein at least one on-off device is said 3-3-type and at least one on-off device is selected from the group including said 2-type, said 2-3-type, said 2-3-3-type and said 3-3-3-type.

8. A fluid control apparatus according to claim 7 wherein two kinds of fluids are passed through at least one of the fluid controllers, and a bypass channel bypassing said at least one fluid controller is provided between the inlet side and the outlet side thereof, the 3-3-type on-off device being disposed at each of the inlet side and the outlet side of said at least one fluid controller.

9. A fluid control apparatus according to claim 1 wherein at least one on-off device is said 3-3-3-type and at least one on-off device is selected from the group including said 2-type, said 2-3-type, said 2-3-3-type and said 3-3-type.

10. A fluid control apparatus according to claim 1 wherein all types on-off devices are included in the fluid control apparatus.

11. A fluid control apparatus according to claim 10 wherein two kinds of fluids are passed through at least one of the fluid controllers, and the 2-3-type on-off device is disposed at the inlet side of said at least one fluid controller, the 2-3-3-type on-off device being disposed at the outlet side thereof.

12. A fluid control apparatus according to claim 10 wherein two kinds of fluids are passed through at least one of the fluid controllers, and an evacuating channel is provided at the outlet side of said at least one fluid controller, a bypass channel bypassing said at least one fluid controller and being provided between the inlet side and the outlet side thereof, the 3-3-type on-off device being disposed at the inlet side of said at least one fluid controller, the 3-3-3-type on-off device being disposed at the outlet side thereof.

* * * * *